United States Patent
Kattainen et al.

(10) Patent No.: US 11,380,190 B2
(45) Date of Patent: Jul. 5, 2022

(54) SAFETY COMMUNICATION IN AN ELEVATOR COMMUNICATION SYSTEM

(71) Applicant: Kone Corporation, Helsinki (FI)

(72) Inventors: Ari Kattainen, Helsinki (FI); Juha-Matti Aitamurto, Helsinki (FI); Gergely Huszak, Helsinki (FI); Ferenc Staengler, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 17/226,758

(22) Filed: Apr. 9, 2021

(65) Prior Publication Data

US 2021/0343138 A1    Nov. 4, 2021

(30) Foreign Application Priority Data

Apr. 30, 2020    (EP) .................................... 20172443

(51) Int. Cl.
| | | |
|---|---|---|
| *G06F 15/16* | (2006.01) | |
| *G08B 26/00* | (2006.01) | |
| *H04L 12/18* | (2006.01) | |

(52) U.S. Cl.
CPC .......... *G08B 26/00* (2013.01); *H04L 12/1863* (2013.01); *H04L 12/1895* (2013.01)

(58) Field of Classification Search
None
See application file for complete search history.

(56) References Cited

U.S. PATENT DOCUMENTS

| 4,798,267 A * | 1/1989 | Foster ................... B66B 1/3492 |
| | | 187/394 |
| 5,289,176 A * | 2/1994 | Novakovich ........... G06F 13/14 |
| | | 370/254 |
| 8,959,405 B2 * | 2/2015 | Ikawa ....................... B66B 1/34 |
| | | 714/704 |
| 2003/0154285 A1* | 8/2003 | Berglund .............. H04L 69/165 |
| | | 709/227 |
| 2005/0004726 A1* | 1/2005 | Paquet ............... G05B 19/0428 |
| | | 701/36 |

(Continued)

FOREIGN PATENT DOCUMENTS

| EP | 3246281 A1 | 11/2017 |
| EP | 3492419 A1 | 6/2019 |

(Continued)

OTHER PUBLICATIONS

European Search Report dated Oct. 20, 2020.

*Primary Examiner* — Phyllis A Book
(74) *Attorney, Agent, or Firm* — Harness, Dickey & Pierce, PLC (57) ABSTRACT

According to an aspect, there is provided an elevator communication system. The system comprises an ethernet bus, a safety master node communicatively connected to the ethernet bus and configured to communicate via the ethernet bus, and safety slave nodes communicatively connected to the ethernet bus and configured to communicate via the ethernet bus. The safety master node and the safety slave nodes are configured to communicate by using a time-triggered communication protocol. In the time-triggered communication protocol the safety master node is configured to send a polling diagnostic request message to the safety slave nodes by using a predetermined polling cycle.

22 Claims, 5 Drawing Sheets

(56) References Cited

U.S. PATENT DOCUMENTS

| | | | |
|---|---|---|---|
| 2008/0273527 A1* | 11/2008 | Short | H04J 3/0655 |
| | | | 370/364 |
| 2016/0156502 A1* | 6/2016 | Fugitt | H04L 41/0668 |
| | | | 709/205 |
| 2017/0334678 A1* | 11/2017 | Sonnenmoser | B66B 5/0031 |
| 2020/0153913 A1* | 5/2020 | Armistead | H04L 12/44 |
| 2020/0190931 A1* | 6/2020 | Moen | H01Q 1/04 |
| 2020/0343993 A1* | 10/2020 | Rentschler | H04L 67/1051 |

FOREIGN PATENT DOCUMENTS

| | | | | |
|---|---|---|---|---|
| WO | WO-03055152 A1 * | 7/2003 | | H04L 12/403 |
| WO | WO2003055152 A1 * | 7/2003 | | |
| WO | WO-2008101394 A1 * | 8/2008 | | H04L 12/66 |
| WO | WO-2018202736 A1 | 11/2018 | | |

\* cited by examiner

SAFETY COMMUNICATION IN AN ELEVATOR COMMUNICATION SYSTEM

RELATED APPLICATIONS

This application claims priority to European Patent Application No. EP20172443.2, filed on Apr. 30, 2020, the entire contents of which are incorporated herein by reference.

TECHNICAL FIELD

The solution relates to the field of elevator communication systems. More specifically, the solution relates to safety communication in an elevator communication system.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different communication stacks and multiple different physical layers may be used simultaneously. The use of multiple different internal data transmission solutions may result in a complicated and inefficient solution. Further, in current solutions safety related data may be sent using a dedicated communication path between various safety related elements using a complicated communication protocol. This can mean that a separate safety communication system is needed in isolation of other elevator communication system(s), which may be complicated, expensive and increases overall latency in the elevator communication system. Thus, it would be beneficial to have a solution that would alleviate at least one of these drawbacks.

SUMMARY

According to a first aspect, there is provided an elevator communication system comprising an ethernet bus, a safety master node communicatively connected to the ethernet bus and configured to communicate via the ethernet bus, safety slave nodes communicatively connected to the ethernet bus and configured to communicate via the ethernet bus. The safety master node and the safety slave nodes are configured to communicate by using a time-triggered communication protocol. In the time-triggered communication protocol the safety master node is configured to send a polling diagnostic request message to the safety slave nodes by using a predetermined polling cycle.

In an implementation form of the first aspect, the polling cycle depends on an operational status of an elevator car.

In an implementation form of the first aspect, the safety slave nodes are divided into at least two different polling groups having group specific polling cycles.

In an implementation form of the first aspect, the safety master node and the safety slave nodes are configured to communicate by using both the time-triggered communication protocol and an event-triggered communication protocol, wherein in the event-triggered communication protocol a safety slave node of the safety slave nodes is configured to send a status change message associated with the safety slave node to the safety master node in response to monitoring a status change.

In an implementation form of the first aspect, in the time-triggered communication protocol the safety master node is configured to send a broadcast diagnostic request message to the safety slave nodes, and each of the safety slave nodes is configured to respond with a diagnostic reply message.

In an implementation form of the first aspect, in the time-triggered communication protocol the safety master node is configured to send a separate diagnostic request message to each of the safety slave nodes, and each of the safety slave nodes is configured to respond with a diagnostic reply message.

In an implementation form of the first aspect, in the time-triggered communication protocol the safety master node is configured to send a broadcast diagnostic request message to the safety slave nodes, and each of the safety slave nodes is configured to respond with a diagnostic reply message within a dedicated time window. In an example embodiment, the total polling cycle time may be adjustable such that the total cycle time is lengthened when new safety slave nodes are added to the bus segment.

In an implementation form of the first aspect, when receiving no diagnostic reply message from a safety slave node within a dedicated time window, the safety master node is configured to send a dedicated diagnostic request message to the safety slave node.

In an implementation form of the first aspect, the diagnostic reply message comprises a status indication associated with the safety slave node.

In an implementation form of the first aspect, in the event-triggered communication protocol the safety master node is configured to reply with an acknowledgement message to the safety slave node upon receipt of the status change message.

In an implementation form of the first aspect, in the event-triggered communication protocol the safety slave node is configured to repeat sending of the message to the safety master node until receiving an acknowledgement message from the safety master node.

In an implementation form of the first aspect, the safety master node is configured to divide the safety slave nodes into at least two groups and to apply a group-specific polling cycle for the at least two groups.

In an implementation form of the first aspect, the ethernet bus comprises a multi-drop ethernet bus segment, and the safety slave nodes are connected to the multi-drop ethernet bus segment.

In an implementation form of the first aspect, the elevator communication system further comprises a multi-drop ethernet bus segment communicatively connected to the ethernet bus and wherein the ethernet bus comprises a point-to-point ethernet bus, wherein at least one of the safety slave nodes is communicatively connected to the ethernet bus via the multi-drop ethernet bus segment.

In an implementation form of the first aspect, the safety master slave is connected to the point-to-point ethernet bus.

In an implementation form of the first aspect, the ethernet bus comprises a multi-drop ethernet bus segment.

In an implementation form of the first aspect, both in the time-triggered communication protocol and in the event-triggered communication protocol turnaround time of the messaging between the safety master node and the safety slave nodes is determined to analyze bus traffic.

In an implementation form of the first aspect, a message from a safety slave node comprises a sequence number of last event data.

In an implementation form of the first aspect, the safety master node is configured to perform a safety shutdown of an elevator based on a message received from a safety slave node.

In an implementation form of the first aspect, a safety slave node of the safety slave nodes comprises one of the following: a node associated with an elevator shaft side entity; a node associated with an elevator car; and a node associated with a machinery entity.

In an implementation form of the first aspect, the safety slave node comprise a connector or an interface for connecting to a safety device or safety sensor, for example, a safety contact of an elevator safety chain.

In an implementation form of the first aspect, the safety slave node is integrated with the safety device or the safety sensor.

According to a second aspect, there is provided a method for safety communication in an elevator communication system, the elevator communication system comprising an ethernet bus, a safety master node communicatively connected to the ethernet bus and configured to communicate via the ethernet bus, safety slaves nodes communicatively connected to the ethernet bus and configured to communicate via the ethernet bus. The method comprises communicating with the safety master node and the safety slave nodes by using a time-triggered communication protocol; and sending by the safety master node in the time-triggered communication protocol a polling diagnostic request message to the safety slave nodes by using a predetermined polling cycle.

In an implementation form of the second aspect, the method further comprises communicating with the safety master node and the safety slave nodes the safety master node and the safety slave nodes by using both the time-triggered communication protocol and an event-triggered communication protocol, wherein in the event-triggered communication protocol sending, by a safety slave node of the safety slave nodes, a status change message associated with the safety slave node to the safety master node in response to monitoring a status change.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator communication system that comprises an ethernet bus, a safety master node communicatively connected to the ethernet bus and configured to communicate via the ethernet bus, and safety slave nodes communicatively connected to the ethernet bus and configured to communicate via the ethernet bus. The safety master node and the safety slave nodes are configured to communicate by using a time-triggered communication protocol. Further, in the time-triggered communication protocol the safety master node is configured to send a polling diagnostic request message to the safety slave nodes by using a predetermined polling cycle.

In an example embodiment, the safety master node and the safety slave nodes are configured to communicate by using both the time-triggered communication protocol and an event-triggered communication protocol, wherein in the event-triggered communication protocol a safety slave node of the safety slave nodes is configured to send a status change message associated with the safety slave node to the safety master node in response to monitoring a status change. The illustrated solution enables separating diagnostic messages from event associated messages.

In an example embodiment, the various embodiments discussed below may be used in an elevator system comprising an elevator that is suitable and may be used for transferring passengers between landing floors of a building in response to service requests. In another example embodiment, the various embodiments discussed below may be used in an elevator system comprising an elevator that is suitable and may be used for automated transferring of passengers between landings in response to service requests.

Figure 1A:
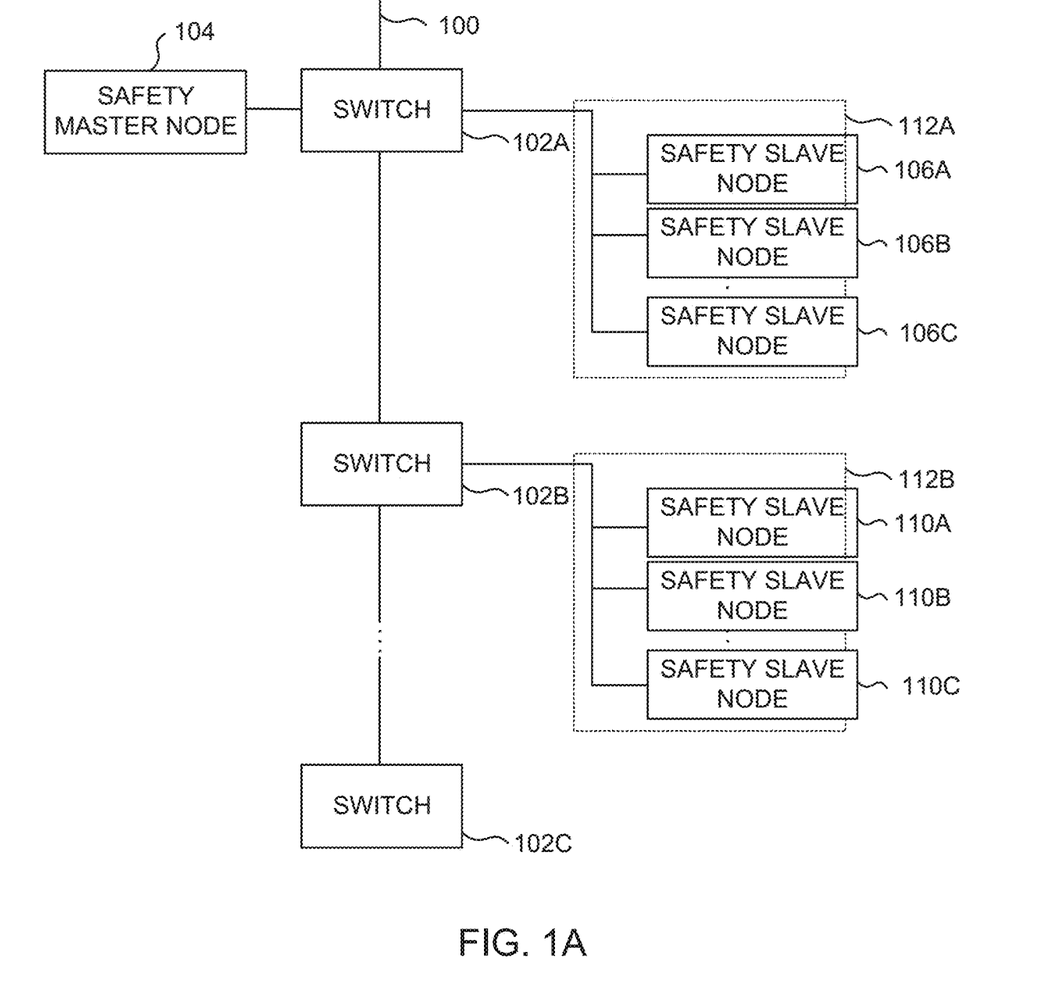
FIG. 1A illustrates an elevator communication system according to an example embodiment.

FIG. 1A illustrates an elevator communication system according to an example embodiment. The elevator communication system comprises a point-to-point ethernet bus 100 and at least one connecting unit 102A, 102B, 102C. One of more of the at least one connecting unit 102A, 102B, 102C may comprise a first port connected to a multi-drop ethernet bus segment 112A, 112B and a second port connected to the point-to-point ethernet bus 100. Thus, by using the connecting units 102A, 102B, 102C, one or more multi-drop ethernet bus segments 112A, 112B may be connected to the point-to-point ethernet bus 100. The connecting unit 102A, 102B, 102C may refer, for example, to a switch, a hub or a router. Further, the point-to-point ethernet bus 100 may be connected to an elevator controller. The point-to-point ethernet bus 100 may be, for example, 100BASE-TX or 10BASET1L point-to-point ethernet bus. The multi-drop ethernet bus segment 112A, 112B may comprise, for example, 10BASE-T1S multi-drop ethernet bus.

The elevator communication system further comprises a safety master node 104 connected to the connecting unit 102A, and safety slave nodes 106A, 106B, 106C, 110A. The safety slave nodes 106A, 106B, 106C may be connected to the multi-drop ethernet bus segment 112A and the safety slave nodes 110A, 110B, 110C may be connected to the multi-drop ethernet bus segment 112B. The safety master node 104 may be separate from an elevator controller or it may be integrated with the elevator controller to form a single entity. In an example embodiment, the safety master node 104 may be a programmable safety controller configured to implement safety integrity level 3 (SIL 3) in accordance with norm IEC 61508. It may be configured to selectively allow or prevent elevator operation based on the information received from the safety slave nodes. In particular, the safety master node 104 may be configured to perform safety shutdown of an elevator if an operational anomaly of the elevator has been detected. The safety shutdown may comprise activating hoisting machine brakes and interrupting power supply to hoisting motor. The safety master node 104 may be a separate control entity or it may integrated with another elevator control unit.

Figure 1B:
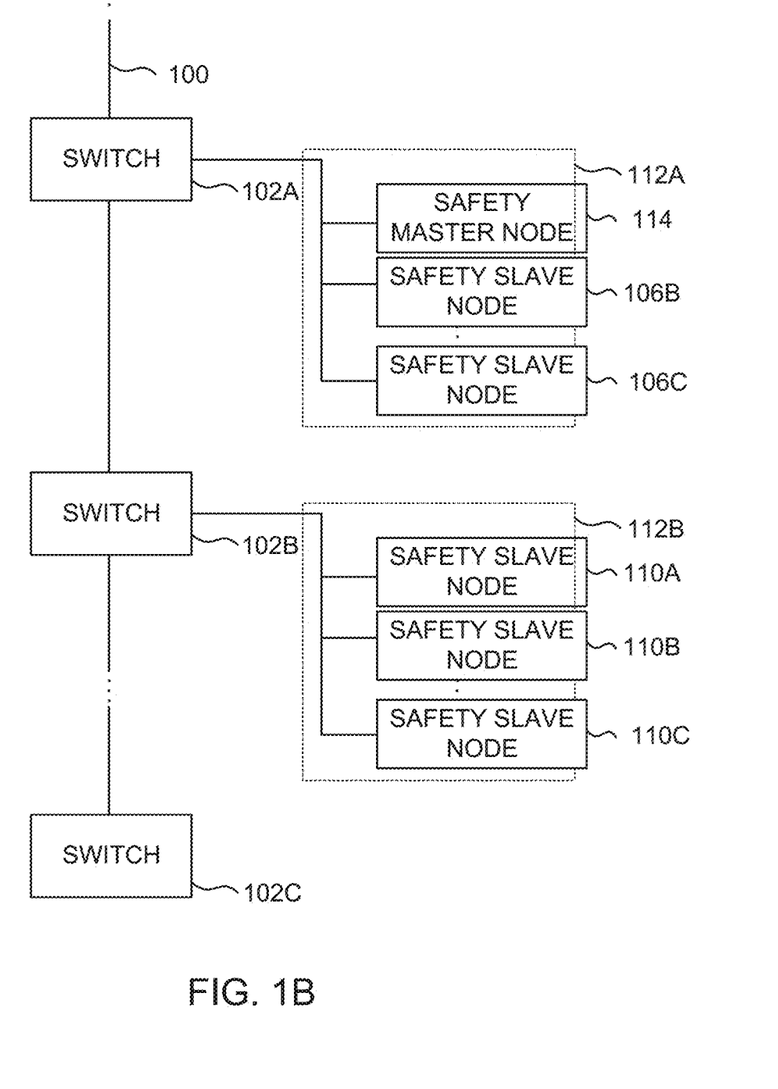
FIG. 1B illustrates an elevator communication system according to another example embodiment.

FIG. 1B illustrates an elevator communication system according to an example embodiment. The elevator communication system comprises a point-to-point ethernet bus 100 and at least one connecting unit 102A, 102B, 102C. One or more of the at least one connecting unit 102A, 102B, 102C may comprise a first port connected to a multi-drop ethernet bus segment 112A, 112B and a second port connected to the point-to-point ethernet bus 100. Thus, by using the connecting units 102A, 102B, 102C, one or more multi-drop ethernet bus segments 112A, 112B may be connected to the point-to-point ethernet bus 100. The connecting unit 102A, 102B, 102C may refer, for example, to a switch, a hub or a router. Further, the point-to-point ethernet bus 100 may be connected to an elevator controller. The point-to-point ethernet bus 100 may be, for example, 100BASE-TX or 10BASET1L point-to-point ethernet bus. The multi-drop ethernet bus segment 112A, 112B may comprise, for example, 10BASE-T1S multi-drop ethernet bus.

The elevator communication system further comprises a safety master node 114 connected to the multi-drop ethernet bus segment 112A, and safety slave nodes, 106B, 106C, 110A, 110B, 110C. The safety slave nodes 106B, 106C may be connected to the multi-drop ethernet bus segment 112A and the safety slave nodes 110A, 110B, 110C may be connected to the multi-drop ethernet bus segment 112B. In an example embodiment, the safety master node 104 may be a programmable safety controller configured to implement safety integrity level 3 (SIL 3) in accordance with norm IEC 61508. It may be configured to selectively allow or prevent elevator operation based on the information received from the safety slave nodes. In particular, the safety master node 104 may be configured to perform safety shutdown of an elevator if an operational anomaly of the elevator has been detected. The safety shutdown may comprise activating hoisting machine brakes and interrupting power supply to hoisting motor. The safety master node 104 may be a separate control entity or it may integrated with another elevator control unit.

Figure 1C:
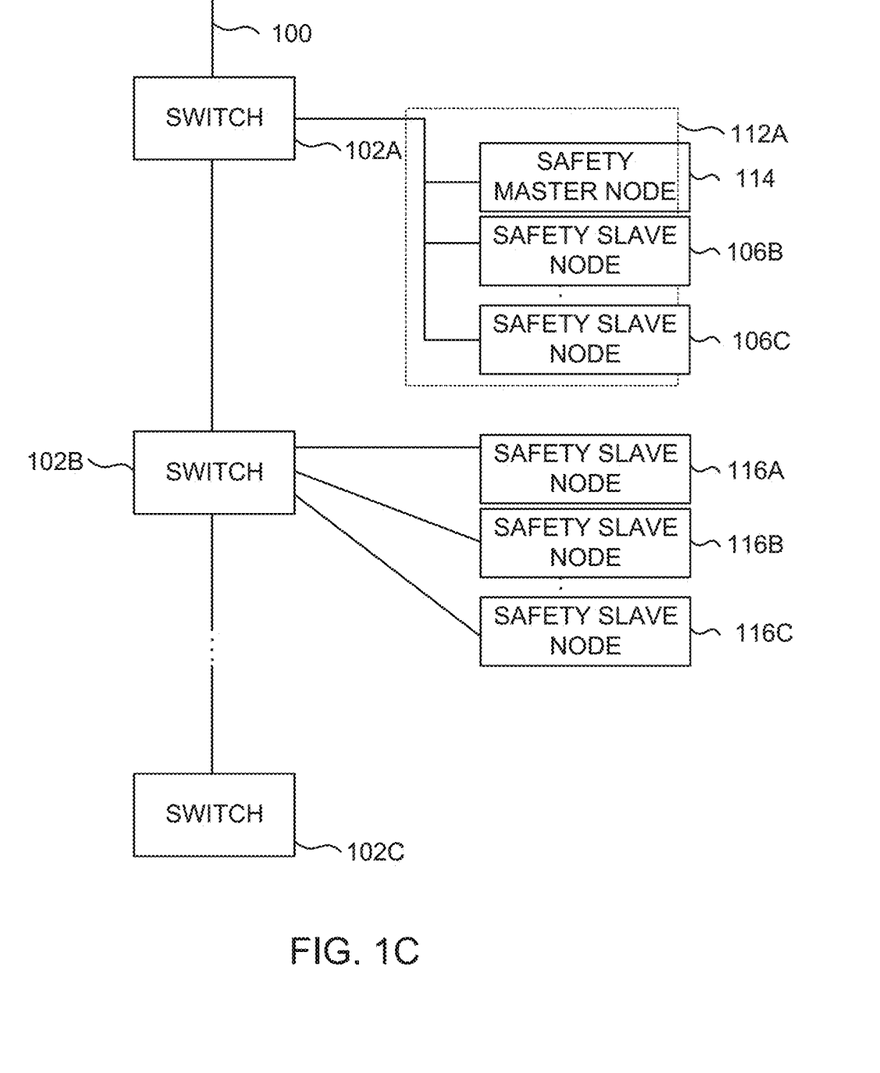
FIG. 1C illustrates an elevator communication system according to another example embodiment.

FIG. 1C illustrates an elevator communication system according to an example embodiment. The elevator communication system comprises a point-to-point ethernet bus 100 and at least one connecting unit 102A, 102B, 102C. One of more of the at least one connecting unit 102A, 102B, 102C may comprise a first port connected to a multi-drop ethernet bus segment 112A, 112B and a second port connected to the point-to-point ethernet bus 100. Thus, by using the connecting units 102A, 102B, 102C, one or more multi-drop ethernet bus segments 112A, 112B may be connected to the point-to-point ethernet bus 100. The connecting unit 102A, 102B, 102C may refer, for example, to a switch, a hub or a router. Further, the point-to-point ethernet bus 100 may be connected to an elevator controller. The point-to-point ethernet bus 100 may be, for example, 100BASE-TX or 10BASET1L point-to-point ethernet bus. The multi-drop ethernet bus segment 112A, 112B may comprise, for example, 10BASE-T1S multi-drop ethernet bus.

The elevator communication system further comprises a safety master node 114 connected to the multi-drop ethernet bus segment 112A, and safety slave nodes 106B, 106C connected to the multi-drop ethernet bus segment 112A. Safety slave nodes 116A, 116B, 116C are separately connected to the point-to-point ethernet bus 100 via the connecting unit 102B. In an example embodiment, the safety master node 114 may be a programmable safety controller configured to implement safety integrity level 3 (SIL 3) in accordance with norm IEC 61508. It may be configured to selectively allow or prevent elevator operation based on the information received from the safety slave nodes. In particular, the safety master node 114 may be configured to perform safety shutdown of an elevator if an operational anomaly of the elevator has been detected. The safety shutdown may comprise activating hoisting machine brakes and interrupting power supply to hoisting motor. The safety master node 114 may be a separate control entity or it may integrated with another elevator control unit.

In an example embodiment, the connecting unit 102A, 102B, 102C may comprise an interface for directly interfacing, i.e. without an additional ethernet segment therebetween, with a safety sensor or a safety device.

Figure 1D:
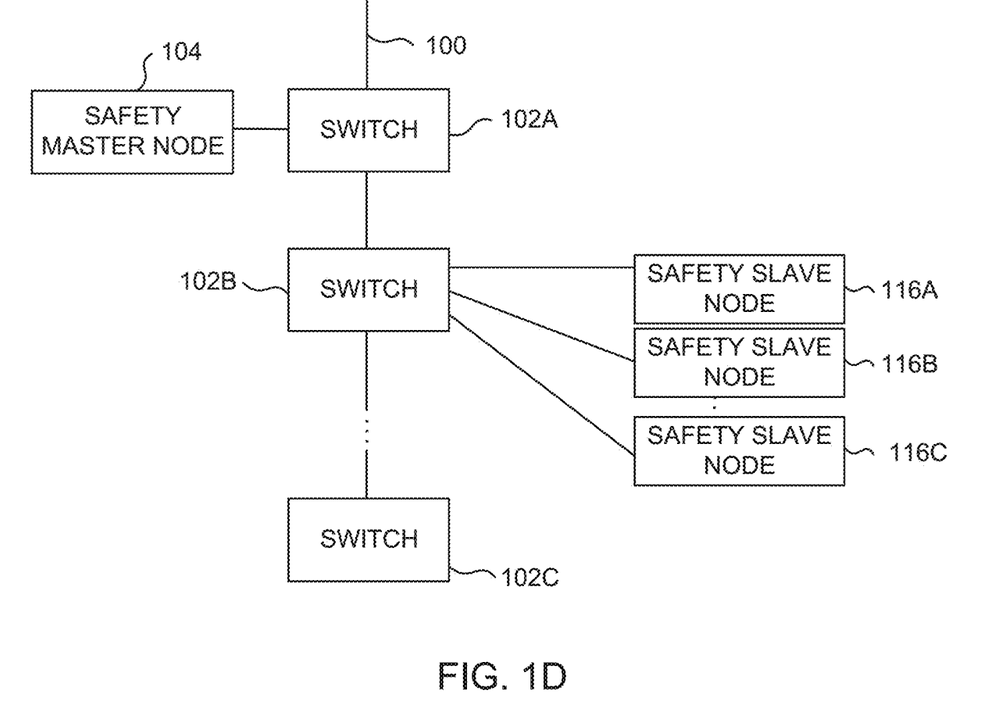
FIG. 1D illustrates an elevator communication system according to another example embodiment.

FIG. 1D illustrates an elevator communication system according to an example embodiment. The elevator communication system comprises a point-to-point ethernet bus 100 and at least one connecting unit 102A, 102B, 102C. Further, the point-to-point ethernet bus 100 may be connected to an elevator controller. The point-to-point ethernet bus 100 may be, for example, 100BASE-TX or 10BASET1L point-to-point ethernet bus.

The elevator communication system further comprises a safety master node 104 connected to the connecting unit 102A, and safety slave nodes 116A, 116B, 116C that are separately connected to the point-to-point ethernet bus 100 via the connecting unit 102B. In an example embodiment, the safety master node 104 may be a programmable safety controller configured to implement safety integrity level 3 (SIL 3) in accordance with norm IEC 61508. It may be configured to selectively allow or prevent elevator operation based on the information received from the safety slave nodes. In particular, the safety master node 104 may be configured to perform safety shutdown of an elevator if an operational anomaly of the elevator has been detected. The safety shutdown may comprise activating hoisting machine brakes and interrupting power supply to hoisting motor. The safety master node 104 may be a separate control entity or it may integrated with another elevator control unit.

Figure 1E:
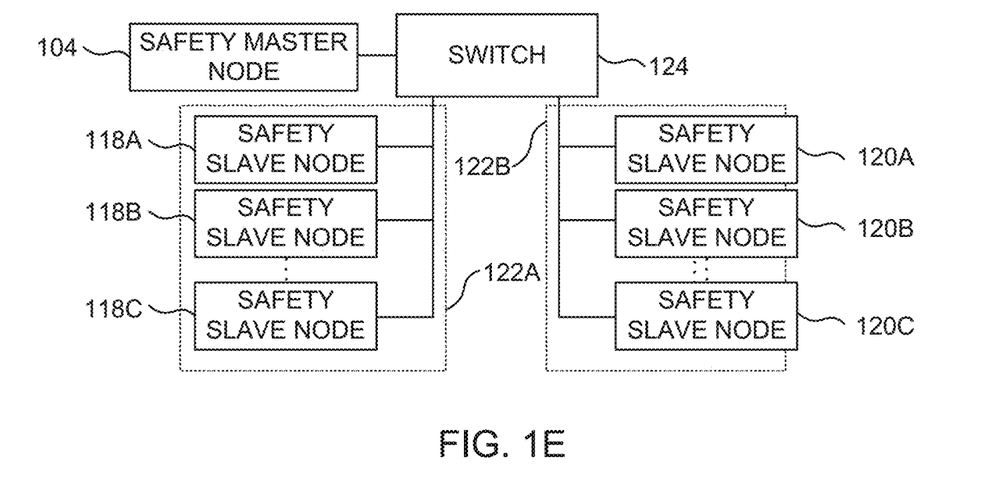
FIG. 1E illustrates an elevator communication system according to another example embodiment.

FIG. 1E illustrates an elevator communication system according to an example embodiment. The elevator communication system comprises a connecting unit 124, for example, a switch, a hub or a router. The elevator communication system further comprises one or more multi-drop ethernet bus segments 122A, 122B connected to the connecting unit 124. The multi-drop ethernet bus segment 122A, 122B may comprise, for example, 10BASE-T1S multi-drop ethernet bus.

The elevator communication system further comprises a safety master node 104 connected to the connecting unit 124, and safety slave nodes 118A, 118B, 118C connected to the multi-drop ethernet bus segment 122A and safety slave nodes 120A, 120B, 120C connected to the multi-drop ethernet bus segment 122B. In an example embodiment, the safety master node 104 may be a programmable safety controller configured to implement safety integrity level 3 (SIL 3) in accordance with norm IEC 61508. It may be configured to selectively allow or prevent elevator operation based on the information received from the safety slave nodes. In particular, the safety master node 104 may be configured to perform safety shutdown of an elevator if an operational anomaly of the elevator has been detected. The safety shutdown may comprise activating hoisting machine brakes and interrupting power supply to hoisting motor. The safety master node 104 may be a separate control entity or it may integrated with another elevator control unit.

Figure 1F:
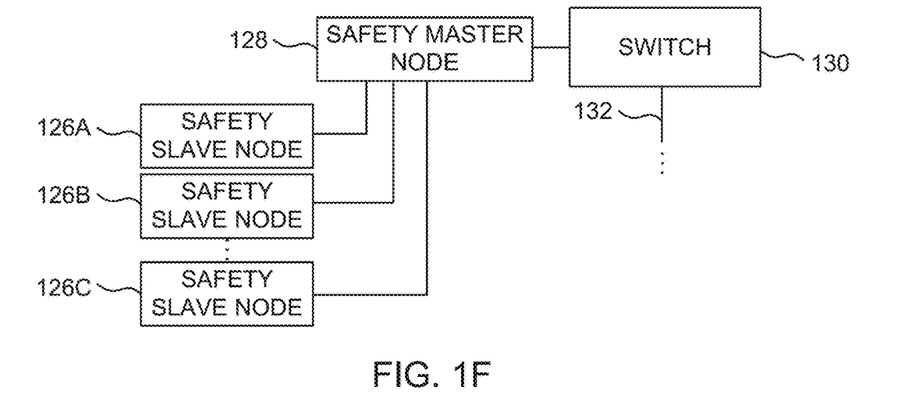
FIG. 1F illustrates an elevator communication system according to another example embodiment.

FIG. 1F illustrates an elevator communication system according to an example embodiment. The elevator communication system comprises a connecting unit 130, for example, a switch, a hub or a router. The connecting unit 130 may be connected to an ethernet bus 132. The elevator communication system further comprises a safety master node 128 connected to the connecting unit 130, and safety slave nodes 126A, 126B, 126C connected directly to the safety master node 128.

Figure 2A:
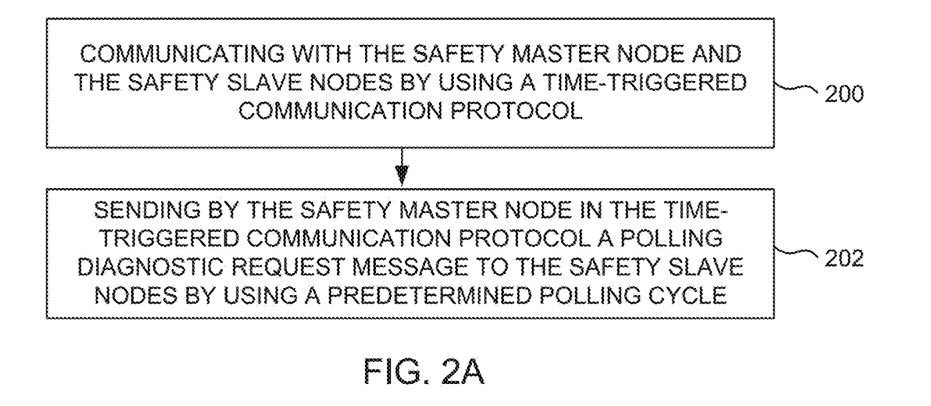
FIG. 2A illustrates a block diagram of a method for safety communication in an elevator communication system according to an example embodiment.

FIG. 2A illustrates a block diagram of a method for safety communication in an elevator communication system according to an example embodiment. The method may be implemented in any of the systems illustrated in FIGS. 1A-1F.

At 200, the safety master node and the safety slave nodes communicate by using a time-triggered communication protocol. At 202, the safety master node sends in the time-triggered communication protocol a polling diagnostic request message to the safety slave nodes by using a predetermined polling cycle.

Figure 2B:
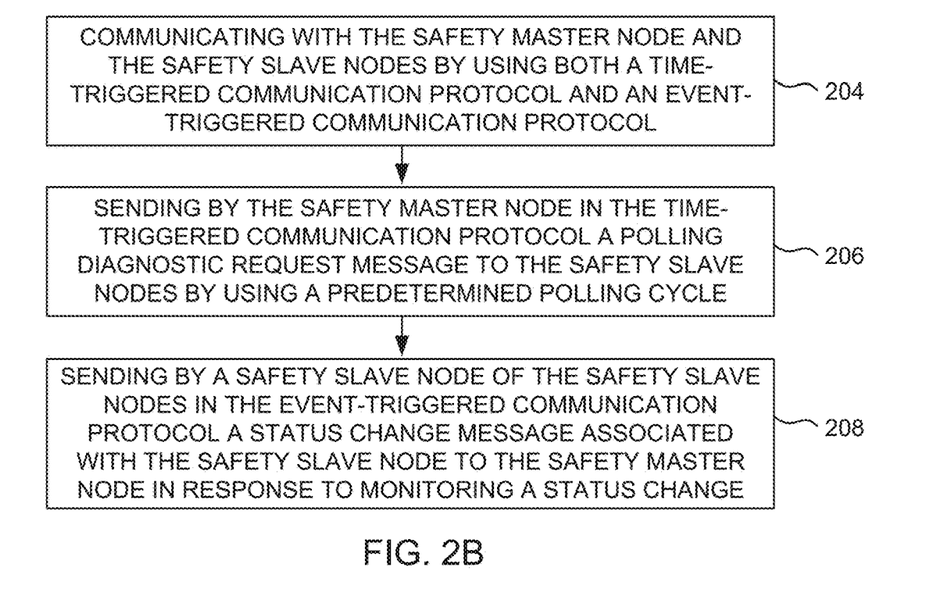
FIG. 2B illustrates a block diagram of a method for safety communication in an elevator communication system according to another example embodiment.

FIG. 2B illustrates a block diagram of a method for safety communication in an elevator communication system according to another example embodiment. The method may be implemented in any of the systems illustrated in FIGS. 1A-1F.

At 204, the safety master node and the safety slave nodes communicate by using both a time-triggered communication protocol and an event-triggered communication protocol. At 206, the safety master node sends in the time-triggered communication protocol a polling diagnostic request message to the safety slave nodes by using a predetermined polling cycle. At 208, a safety slave node sends in the event-triggered communication protocol a status change message associated with the safety slave node to the safety master node in response to monitoring a status change.

When using only the time-triggered communication protocol, this may be applicable in small elevators. For example, in case of 30 slave nodes it is reasonable to use the time triggered protocol with, for example, a 33 ms polling cycle which gives around 1 ms window for each safety slave node message. When the number of safety slave nodes increases, the polling cycle can be relaxed and the sufficient reaction time can be guaranteed by using the event triggered communication. This may enable a solution in which the processing needed at the receiving master node will be decreased.

In an example embodiment, the polling cycle depends on an operational status of an elevator car. This may mean, for example, that when an elevator is idle, a less frequent polling cycle may be adopted than in a situation when the elevator is operating. Alternatively, when an elevator car door and/or a landing door is open, a more frequent polling cycle of a door zone sensor may be adopted than when the door is closed. By polling the door zone sensor more frequently when the door is open, it may be ensured that elevator car does not leave the door zone with an open door, which could lead to a dangerous situation for a passenger.

In an example embodiment, the safety slave nodes may be divided into at least two different polling groups having group specific polling cycles. For example, safety slaves nodes or safety devices disposed in an elevator car and in a pit may be polled with a 10 ms polling cycle whereas safety devices disposed on landings (for example, safety contacts of landing doors) may be polled with a 100 ms polling cycle.

The status change message may comprise a sequence number of last event data. By means of the sequence number, an actual order of status changes in the safety slave node can be solved afterwards by the safety master node. This is useful because in some cases the order of the messages received may be different from the order of the messages sent. The illustrated solution may also enable separating diagnostic messages from event associated messages.

In an example embodiment, in the time-triggered communication protocol the safety master node is configured to send a broadcast diagnostic request message to the safety slave nodes, and each of the safety slave nodes is configured to respond with a diagnostic reply message. This polling cycle may be constant. Alternatively, the sending frequency and/respond frequency may be variable, and it may vary, for example, in accordance with a random generator. This may mean that the time-triggered communication protocol is less vulnerable to electromagnetic interference, such as common mode disturbance.

The diagnostic reply message may comprise a status indication associated with the safety slave node. The reply message may comprise a sequence number of last event data. By means of the sequence number, an actual order of status changes in the safety slave node can be solved afterwards by the safety master node. This is useful because in some cases the order of the messages received may be different from the order of the messages sent. In order to cover possibility that one of the messages is lost, the safety master node may repeat the diagnostics request message, for example, 2-4 times within the required diagnostics reaction time. For example, if using 300 ms polling cycle, this means in case of 200 safety slave nodes 3.3×201 msg/s=663 msg/s.

In an example embodiment, in the time-triggered communication protocol the safety master node is configured to send a separate diagnostic request message to each of the safety slave nodes, and each of the safety slave nodes is configured to respond with a diagnostic reply message. Each of the safety slave nodes may be configured to respond with a diagnostic reply message within a specific time window, for example, 0-10 ms after receiving the diagnostic request message or immediately after receiving the diagnostic request message.

The diagnostic reply message may comprise a status indication associated with the safety slave node. The reply message may comprise a sequence number of last event data. By means of the sequence number, an actual order of status changes in the safety slave node can be solved afterwards by the safety master node. This is useful because in some cases the order of the messages received may be different from the order of the messages sent. If one of the safety slave nodes does not reply within a specified time window, the safety master node may repeat the diagnostics request message for that particular safety slave node. This allows to use a diagnostics cycle which is closer to the diagnostics reaction time requirement. For example, a diagnostics cycle of 700 ms can be used if the reaction requirement is 1 s. If none of the safety slave nodes sends a diagnostic reply message, the safety master node may repeat the diagnostics request message because it can be assumed that master message was lost. For example, in case of 200 slave nodes this would mean (200 msg+200 msg)*1000/700=571 msg/s.

In an example embodiment, in the time-triggered communication protocol the safety master node may be configured to send a broadcast diagnostic request message to the safety slave nodes, and each of the safety slave nodes may be configured to respond with a diagnostic reply message within a dedicated time window. The time window may be safety slave node specific for nodes in the same multi-drop ethernet bus segment. Further, in an example embodiment, the total polling cycle time may be adjustable such that the total cycle time is lengthened when new safety slave nodes are added to the bus segment. The diagnostic reply message may comprise a status indication associated with the safety slave node. If the safety master node fails to receive a reply within the dedicated time window from one of the safety slave nodes, the safety master node may send a dedicated diagnostic request messages for that particular safety slave node repeatedly until a reply is received. For example, in case of 200 safety slave nodes and no lost messages this would mean 201*1000/600=335 msg/s.

In an example embodiment, in the event-triggered communication protocol the safety master node is configured to reply with an acknowledgement message to the safety slave node upon receipt of the status change message. If the safety slave node does not receive the acknowledgement message from the safety master node, the safety slave node may be configured to repeat sending of the message to the safety master node until receiving the acknowledgement message from the safety master node.

In an example embodiment, the safety master node may be configured to divide the safety slave nodes into at least two groups and to apply a group-specific polling cycle for the at least two groups. Some safety slave nodes may have different diagnostics reaction time requirements. Thus, this enables implementing different diagnostic requirements by the safety master node to the different safety slave node groups. For example, for a door zone sensor the diagnostics requirement might be 100 ms and for a floor node it might be 1 s.

In an example embodiment, both in the time-triggered communication protocol and in the event-triggered communication protocol turnaround time of the messaging between the safety master node and the safety slave nodes may be determined to analyze bus traffic. The turnaround time may mean here a time delay from sending a message to receiving a related reply message. The analysis may provide information, such as statistical information about operating characteristics of the bus. For example, if an average turnaround time starts to increase, for example, deviate from what is expected, a degraded operating condition of the bus may be determined. In such a situation, as a specific diagnostic time requirement is set for the safety communication, it may be necessary to take specified maintenance or repairing actions to ensure elevator safety. Thus a maintenance visit may be scheduled if degraded operating condition of the bus is determined or, in case of extensive degradation, the elevator operation may even be terminated.

In an example embodiment, the safety master node may be configured to perform a safety shutdown of an elevator based on a message received from a safety slave node. For example, the message from the safety slave node may indicate a crucial event that has an effect for the operation of the elevator. In an example embodiment, the safety master node may be configured to resume a normal elevator operation based on a message received from a safety slave node (for example, when closing of a safety contact indicates that a landing door has been closed and elevator safety integrity has been restored).

In an example embodiment, a safety slave node of the safety slave nodes may comprise one of the following: a node associated with an elevator shaft side entity, a node associated with an elevator car, and a node associated with a machinery entity. At an elevator shaft side, a safety slave node may be connected to a landing door safety circuit, a voice intercom device, a destination operating panel, a camera, a pit inspection device, a balancing rope sensor, a diverting pulley sensor etc. The node associated with the elevator car may be connected to a car encode, a door zone sensor, a car door safety contact, a car controller board, a car display, a door operator etc. The node associated with the machinery entity may be connected to a drive unit, a machinery sensor, a brake switch etc.

In an example embodiment, the safety slave node may comprise a connector or an interface for connecting to a safety device or safety sensor, in particular a safety contact of an elevator safety chain. In another example embodiment, the safety slave node may be integrated with the safety device or the safety sensor.

At least some of the above discussed example embodiments may allow connecting hundreds of safety related floor (slave) nodes to a safety master node. Further, the safety master node may be implemented with a relatively low cost microcontroller. Further, the illustrated solution uses only a small fraction of communication bandwidth of the ethernet bus. Further, the illustrated solution allows to separate diagnostics in several groups. One group of safety slave nodes can be diagnosed (polled) more frequently than another group.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s).

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator communication system, comprising:
   an Ethernet bus including at least a multi-drop Ethernet bus segment;
   a safety master node communicatively connected to the Ethernet bus and configured to communicate via the Ethernet bus; and
   safety slave nodes communicatively connected to the Ethernet bus with at least one of the safety slave nodes being communicatively connected to the Ethernet bus via the multi-drop Ethernet bus segment, the safety slave nodes configured to communicate via the Ethernet bus, wherein
      the safety master node and the safety slave nodes are configured to communicate at least by a time-triggered communication protocol and an event-triggered communication protocol, in which, in the time-triggered communication protocol, the safety master node is configured to send a polling diagnostic request message to the safety slave nodes using a set polling cycle.

2. The elevator communication system of claim 1, wherein the set polling cycle depends on an operational status of an elevator car.

3. The elevator communication system of claim 1, wherein the safety slave nodes are divided into at least two different polling groups having group specific polling cycles.

4. The elevator communication system of claim 1, wherein
   in the event-triggered communication protocol, a safety slave node of the safety slave nodes is configured to send a status change message associated with the safety slave node to the safety master node in response to monitoring a status change.

5. The elevator communication system of claim 1, wherein in the time-triggered communication protocol the safety master node is configured to send a broadcast diagnostic request message to the safety slave nodes, and each of the safety slave nodes is configured to respond with a diagnostic reply message.

6. The elevator communication system of claim 5, wherein the diagnostic reply message includes a status indication associated with the safety slave node.

7. The elevator communication system of claim 1, wherein in the time-triggered communication protocol the safety master node is configured to send a separate diagnostic request message to each of the safety slave nodes, and each of the safety slave nodes is configured to respond with a diagnostic reply message.

8. The elevator communication system of claim 1, wherein in the time-triggered communication protocol the safety master node is configured to send a broadcast diagnostic request message to the safety slave nodes, and each of the safety slave nodes is configured to respond with a diagnostic reply message within a dedicated time window.

9. The elevator communication system of claim 8, wherein the safety master node is configured to send a dedicated diagnostic request message to a respective one of the safety slave nodes, in response to not receiving the diagnostic reply message from the respective one of the safety slave nodes within the dedicated time window.

10. The elevator communication system of claim 1, wherein
    in the event-triggered communication protocol the safety master node is configured to reply with an acknowledgement message to a respective one of the safety slave nodes upon receipt of a status change message.

11. The elevator communication system of claim 10, wherein in the event-triggered communication protocol the safety slave node is configured to repeat sending of the status change message to the safety master node until receipt of the acknowledgement message from the safety master node.

12. The elevator communication system of claim 1, wherein
    the safety slave nodes are divided into at least two groups of safety slave nodes, and
    the safety master node is configured to apply different group-specific polling cycles for the at least two groups of safety slave nodes.

13. The elevator communication system of claim 1, wherein the Ethernet bus further comprises:
    a point-to-point Ethernet bus.

14. The elevator communication system of claim 13, wherein the safety master node is connected to the point-to-point Ethernet bus.

15. The elevator communication system of claim 1, wherein,
    the safety master node is configured to analyze traffic on the Ethernet bus to determine a turnaround time of messages between the safety master node and the safety slave nodes in the time-triggered communication protocol and in the event-triggered communication protocol.

16. The elevator communication system of claim 1, wherein a reply message from the safety slave nodes includes a sequence number of last event data.

17. The elevator communication system of claim 1, wherein the safety master node is configured to perform a safety shutdown of an elevator based on a message received from one or more of the safety slave nodes.

18. The elevator communication system of claim 1, wherein a safety slave node of the safety slave nodes comprises one of:
    a node associated with an elevator shaft side entity;
    a node associated with an elevator car; and
    a node associated with a machinery entity.

19. The elevator communication system of claim 1, wherein the safety master node is configured to,
receive diagnostic reply messages from the safety slave nodes in response to the polling diagnostic request message sent thereto in accordance with the time-triggered communication protocol, and
receive a status change message from the safety slave nodes in response to the safety slave nodes monitoring a status change in accordance with the event-triggered communication protocol.

20. A method for safety communication in an elevator communication system, the elevator communication system including an Ethernet bus including at least a multi-drop Ethernet bus segment, a safety master node communicatively connected to the Ethernet bus and configured to communicate via the Ethernet bus, and safety slave nodes communicatively connected to the Ethernet bus with at least one of the safety slave nodes being communicatively connected to the Ethernet bus via the multi-drop Ethernet bus segment, the safety slave nodes configured to communicate via the Ethernet bus by a time-triggered communication protocol and by an event-triggered communication protocol, the method comprising:
sending, by the safety master node in the time-triggered communication protocol, a polling diagnostic request message to the safety slave nodes using a set polling cycle.

21. The method of claim 20, wherein the method further comprises:
sending, by a safety slave node of the safety slave nodes, in the event-triggered communication protocol, a status change message associated with the safety slave node to the safety master node in response to monitoring a status change.

22. The method of claim 20, wherein the method further comprising:
receiving, by the safety master node, diagnostic reply messages from the safety slave nodes in response to the polling diagnostic request message sent thereto in accordance with the time-triggered communication protocol, and
receiving, by the safety master node, a status change message from the safety slave nodes in response to the safety slave nodes monitoring a status change in accordance with the event-triggered communication protocol.

* * * * *